(12) United States Patent
Lee et al.

(10) Patent No.: US 12,437,508 B2
(45) Date of Patent: Oct. 7, 2025

(54) URBAN DIGITAL TWIN PLATFORM SYSTEM AND MOVING OBJECT INFORMATION ANALYSIS AND MANAGEMENT METHOD THEREFOR

(71) Applicant: Electronics and Telecommunications Research Institute, Daejeon (KR)

(72) Inventors: A Hyun Lee, Daejeon (KR); Kyung Ho Kim, Daejeon (KR); Sung Woong Shin, Daejeon (KR); Kang Woo Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 517 days.

(21) Appl. No.: 17/892,702

(22) Filed: Aug. 22, 2022

(65) Prior Publication Data

US 2023/0095663 A1    Mar. 30, 2023

(30) Foreign Application Priority Data

Sep. 24, 2021   (KR) .......................... 10-2021-0126589

(51) Int. Cl.
*G06V 20/54*    (2022.01)
*G06T 7/246*    (2017.01)
(Continued)

(52) U.S. Cl.
CPC ............ *G06V 10/764* (2022.01); *G06T 7/246* (2017.01); *G06T 7/73* (2017.01); *G06V 20/54* (2022.01);
(Continued)

(58) Field of Classification Search
CPC .. G06V 10/764; G06V 20/54; G06V 2201/08; G06T 7/246; G06T 7/73;
(Continued)

(56) References Cited

U.S. PATENT DOCUMENTS 10,741,078 B2    8/2020  Kim et al.
10,778,774 B2    9/2020  Kim et al.
(Continued)

FOREIGN PATENT DOCUMENTS

| JP | 2018-121884 | 8/2018 |
|---|---|---|
| KR | 10-1850286 | 4/2018 |

(Continued)

OTHER PUBLICATIONS

Gyllenhammar, Magnus, Carl Zandén, and Martin Törngren. Defining fundamental vehicle actions for the development of automated driving systems. No. 2020-01-0712. SAE Technical Paper, 2020. (Year: 2020).*

*Primary Examiner* — Carol W Chan
(74) *Attorney, Agent, or Firm* — KILE PARK REED & HOUTTEMAN PLLC

(57) ABSTRACT

Provided are an urban digital twin platform system and a moving object information analysis and management method therefor. Through the urban digital twin platform system and the moving object information analysis and management method, a moving object such as a vehicle or a pedestrian may be detected from multimodal sensor data, data on the moving object may be generated, and a situation may be quickly determined by deriving complex actions of the moving object. The urban digital twin platform system includes a multimodal sensor data input and objectification module configured to detect a moving object and to generate objectification data, a multimodal sensor data analysis module configured to classify basic actions of the moving object, to classify complex actions of the moving object, and to (Continued)

generate moving object information, and an urban space data server configured to store the objectification data and the moving object information.

14 Claims, 14 Drawing Sheets

(51) Int. Cl.
  *G06T 7/73* (2017.01)
  *G06V 10/764* (2022.01)
(52) U.S. Cl.
  CPC ............... *G06T 2207/30232* (2013.01); *G06T 2207/30236* (2013.01); *G06T 2207/30241* (2013.01)
(58) Field of Classification Search
  CPC . G06T 2207/30232; G06T 2207/30236; G06T 2207/30241
  See application file for complete search history.

(56) References Cited

U.S. PATENT DOCUMENTS

| | | | |
|---|---|---|---|
| 11,106,949 B2* | 8/2021 | Zia | G06N 3/08 |
| 2016/0104298 A1* | 4/2016 | Nam | H04N 13/204 |
| | | | 434/258 |
| 2016/0364912 A1* | 12/2016 | Cho | G06T 19/006 |
| 2018/0178801 A1* | 6/2018 | Hashimoto | B62D 15/025 |
| 2020/0089940 A1* | 3/2020 | Hsieh | G06F 18/253 |

FOREIGN PATENT DOCUMENTS

| | | |
|---|---|---|
| KR | 10-2139524 | 7/2020 |
| KR | 10-2021-0063607 | 6/2021 |
| KR | 10-2021-0067774 | 6/2021 |
| KR | 10-2282800 | 7/2021 |
| KR | 10-2021-0108044 | 9/2021 |

\* cited by examiner

FIG. 2C
PRIOR ART

| LEVEL 2 (32,15) | LEVEL 2 (33,15) | LEVEL 2 (34,15) | LEVEL 2 (35,15) |
|---|---|---|---|
| LEVEL 2 (32,14) | LEVEL 2 (33,14) | LEVEL 2 (34,14) | LEVEL 2 (35,14) |
| LEVEL 2 (32,13) | LEVEL 2 (33,13) | LEVEL 2 (34,13) | LEVEL 2 (35,13) |
| LEVEL 2 (32,12) | LEVEL 2 (33,12) | LEVEL 2 (34,12) | LEVEL 2 (35,12) |

URBAN DIGITAL TWIN PLATFORM SYSTEM AND MOVING OBJECT INFORMATION ANALYSIS AND MANAGEMENT METHOD THEREFOR

CROSS-REFERENCE TO RELATED APPLICATION

This application claims priority to and the benefit of Korean Patent Application No. 10-2021-0126589, filed on Sep. 24, 2021, the disclosure of which is incorporated herein by reference in its entirety.

BACKGROUND

1. Technical Field

The present disclosure relates to an urban digital twin platform system and an information processing method therefor.

2. Related Art

In order to quickly ascertain and cope with the causes of city phenomena such as traffic, environment, energy, disasters, and safety due to urbanization, a technology capable of reproducing, analyzing, and monitoring a problem generation process from various angles is required. A digital twin is an intelligent convergence technology of analyzing, in the virtual world, various information collected from the real world, deriving an optimization plan, and optimizing the real world on the basis of the optimization plan. That is, the digital twin isa technology of copying machines, equipment, objects, or the like in the real world with a computer, generating a digital virtual twin, simulating situations that may occur in the real world, and predicting the situations in advance. A digital twin of a city may be generated as a solution to the urbanization problem, and may be used for decision-making about the city.

In the existing urban digital twin, it is common to build a digital model similar to reality by connecting a three-dimensional model of terrain, buildings, roads and the like with sensor data on weather, temperature, humidity, fine dust, and traffic volume. However, in order to ensure pedestrian safety, alleviate traffic congestion, and make city planning decisions based on precise statistical data, a technology of sensing, storing, and managing dynamic data (data that changes in real time) about people who are the city's main subjects and movable objects such as vehicles, which are the main means of transportation, is required.

Hereinafter, examples, limitations, and problems of an urban digital twin in the related art will be described.

<Virtual Singapore>

Prior to city planning, the Singapore government built a three-dimensional (3D) digital twin model of all buildings and terrain in Singapore for simulation. The 3D model built by France's Dassault Systèmes was implemented with static data and dynamic data on an object with a fixed position. Through the use of this data, demonstration services such as a navigation service for the elderly/disabled people, a new building licensing service considering temperature and sunlight, and a prediction of solar energy production were presented. The virtual Singapore has a limitation in that it is possible to analyze only data on objects with a fixed position in the city.

<Tile-Based Spatial Information Management—V World>

FIG. 1 is an exemplary diagram of a quadtree-based tile structure (source: V World). According to the quadtree-based tile structure, a map representing the surface of the earth is equally divided (divided into 50 equal squares in the example of FIG. 1), and each square is called a tile. One tile is divided into 4 equally sized 'child tiles'. The spatial information resolutions of all tiles are the same as one another. Thus, as more tiles are used for the same area, the visualized result has a higher resolution, so it is precisely expressed.

FIG. 2A to FIG. 2C are exemplary diagrams illustrating tile division according to tile levels in the quadtree-based tile structure (source: V World). FIG. 2A is a tile structure including one level-0 tile, FIG. 2B is a tile structure including four level-1 tiles, and FIG. 2C is a tile structure including 16 level-2 tiles.

When spatial information is stored and managed with the quadtree tile structure, large-capacity data can be searched or classified quickly. However, since the size and position of the tile are fixed in advance, it is not efficient to store and manage data on an object (moving object) whose position may change over time. That is, when an object at a specific position in a tile moves to a position in another tile, there is a problem in that states of all tiles existing on the path of the moving object need be updated. The data storage management method based on the quadtree tile structure classifies all spatial information data built within the attribute of a tile. About 30 types of administrative information-based data in V World such as aerial images, digital elevation model (DEM), buildings, administrative districts, place names, building names, and road information are managed.

<Object Data Management of Autonomous Vehicle—Tesla>

A vehicle having an autonomous driving or driving assistance technology, such as Tesla, detects pedestrians, vehicles and stationary objects around the vehicle through various sensors and manages the detected data. In such a case, position data of the pedestrians, the vehicles, and the stationary objects around the vehicle are acquired by analyzing a relative positional relationship with the vehicle. It is different from the field of spatial information management in that the object data acquired from the autonomous vehicle is temporarily used for autonomous driving or driving assistance in the current driving situation.

SUMMARY

Various embodiments are directed to providing a method for detecting a moving object (object whose position changes over time such as a pedestrian or a vehicle) by using a camera sensor such as a CCTV or a black box and analyzing a situation, a method for storing and managing data on the moving object, and an urban digital twin platform system to which these methods are applied.

That is, an object of the present disclosure is to provide a moving object information analysis and data storage/management method for building an urban digital twin model and platform, and an urban digital twin platform system to which the method is applied.

The object of the present disclosure is not limited to the object mentioned above, and other objects not mentioned will be clearly understood by those skilled in the art from the following description.

In order to solve the above-described problems, an urban digital twin platform system in accordance with an embodiment of the present disclosure includes: a multimodal sensor data input and objectification module configured to detect a moving object from data collected by a sensor and to generate objectification data that is data on the moving object; a multimodal sensor data analysis module configured to classify basic actions of the moving object on the basis of the objectification data, to classify complex actions of the moving object through pattern analysis on the basic actions, and to generate moving object information; and an urban space data server configured to store the objectification data and the moving object information.

The urban digital twin platform system in accordance with an embodiment of the present disclosure may further include a CCTV recorder interface module configured to provide the multimodal sensor data input and objectification module with an interface for accessing image data stored in a CCTV recorder.

The urban digital twin platform system in accordance with an embodiment of the present disclosure may further include an urban space data visualization module configured to extract the data and information, which is stored in the urban space data server, according to time and spatial conditions, and to visualize the extracted data and information.

When the data collected by the sensor is image data, the multimodal sensor data input and objectification module may detect the moving object for each frame of the image data.

Furthermore, when the data collected by the sensor is image data, the multimodal sensor data input and objectification module may detect the moving object on the basis of a position and a size of the moving object displayed in the image data by using a deep learning-based multi-object tracking technology.

Furthermore, when the data collected by the sensor is image data, the multimodal sensor data input and objectification module may acquire a position vector of the moving object by converting pixel coordinates where the moving object is located in the image data into (longitude, position, and altitude).

On the other hand, the multimodal sensor data analysis module may classify the basic actions of the moving object by using the objectification data of the moving object and information collected from the outside.

Furthermore, the multimodal sensor data analysis module may classify the complex actions of the moving object by determining whether a pattern of a plurality of successive basic actions of the moving object matches a specific pattern. The complex actions include combined basic actions.

On the other hand, the urban space data server may store the objectification data and the moving object information for each tile on the basis of an installation position of a sensor having detected the moving object.

Furthermore, the urban space data server may store only the objectification data and the moving object information without storing image data collected by a camera sensor.

Furthermore, the urban space data visualization module may reproduce dynamic data including the moving object by changing viewpoints.

A moving object information analysis and management method in accordance with an embodiment of the present disclosure includes: a data objectification step of detecting a moving object from sensor data and generating objectification data that is data on the moving object; a situation analysis step of classifying basic actions of the moving object at a specific point in time on the basis of the objectification data, classifying complex actions of the moving object through situation analysis based on the basic actions of the moving object, and generating moving object information; and a data storage step of storing the objectification data and the moving object information.

The data objectification step may include: a sensor data reception step of receiving data collected by a sensor; a moving object detection step of detecting a moving object from the data collected by the sensor; a step of classifying the moving object; a step of acquiring position data of the moving object on the basis of the data collected by the sensor; and a step of acquiring direction data and speed data of the moving object by using the position data.

The situation analysis step may include: a step of receiving the objectification data of the moving object; an external information collection step of collecting information related to the moving object from the outside; a basic action classification step of classifying the basic actions of the moving object at a specific point in time by using the objectification data of the moving object and the information collected from the outside; and a complex action classification step of classifying the complex actions of the moving object through situation analysis based on the basic actions of the moving object.

The data storage step may include: an objectification data and object information reception step of receiving the objectification data and the moving object information; a step of storing the objectification data and the moving object information for each tile on the basis of an installation position of a sensor having detected the moving object; and a step of updating metadata of the tile when a sensor is additionally installed or removed in the tile.

A data objectification method in accordance with an embodiment of the present disclosure includes: a sensor data reception step of receiving image data in which a moving object is captured; a moving object detection step of detecting the moving object by using a position and a size of the moving object displayed in the image data; a step of classifying the moving object; a position data acquisition step of acquiring position data of the moving object on the basis of pixel coordinates where the moving object is located in the image data; and a step of acquiring direction data and speed data of the moving object by using the position data.

In the position data acquisition step, the position data of the moving object may be acquired by converting the pixel coordinates where the moving object is located in the image data into (longitude, position, and altitude).

A situation analysis method in accordance with an embodiment of the present disclosure includes: a step of receiving objectification data of a moving object; an external information collection step of collecting external information related to the moving object; a basic action classification step of classifying basic actions of the moving object at a specific point in time by using the objectification data of the moving object and the external information; and a complex action classification step of classifying complex actions of the moving object through situation analysis based on the basic actions of the moving object. The objectification data may include an ID, a type, a position, a data collection time of the moving object.

In the complex action classification step, the complex actions of the moving object may be classified by determining whether a pattern of a plurality of successive basic actions of the moving object matches a specific pattern. The complex actions include combined basic actions.

An urban digital twin platform system and a moving object information analysis and management method therefor in accordance with an embodiment of the present disclosure have an effect capable of quickly determining a situation by detecting a moving object such as a vehicle or pedestrian by using multimodal sensor data, generating data on the moving object (objectification data), and deriving complex actions of the moving object through analysis of the objectification data.

Furthermore, an urban digital twin platform system and a moving object information analysis and management method therefor in accordance with an embodiment of the present disclosure have an effect that an urban space data server can prevent wastage of a storage space due to image data storage by storing only objectification data and analysis result information.

Furthermore, an urban digital twin platform system and a moving object information analysis and management method therefor in accordance with an embodiment of the present disclosure have an effect capable of visualizing data stored in an urban space data server and reproducing a problem occurrence process from various angles, thereby accurately ascertaining and coping with the cause of a phenomenon occurring in a city.

Furthermore, an urban digital twin platform system and a moving object information analysis and management method therefor in accordance with an embodiment of the present disclosure have an effect that a user can analyze and simulate various problems and situations occurring in a city by using a platform presented in the present disclosure.

The effects of the present disclosure are not limited to the above-mentioned effects, and the other effects which are not mentioned herein will be clearly understood from the following descriptions by those skilled in the art.

BRIEF DESCRIPTION OF THE DRAWINGS

FIG. 2A to FIG. 2C are exemplary diagrams illustrating tile division according to tile levels in the quadtree-based tile structure.

DETAILED DESCRIPTION

Figure 1:
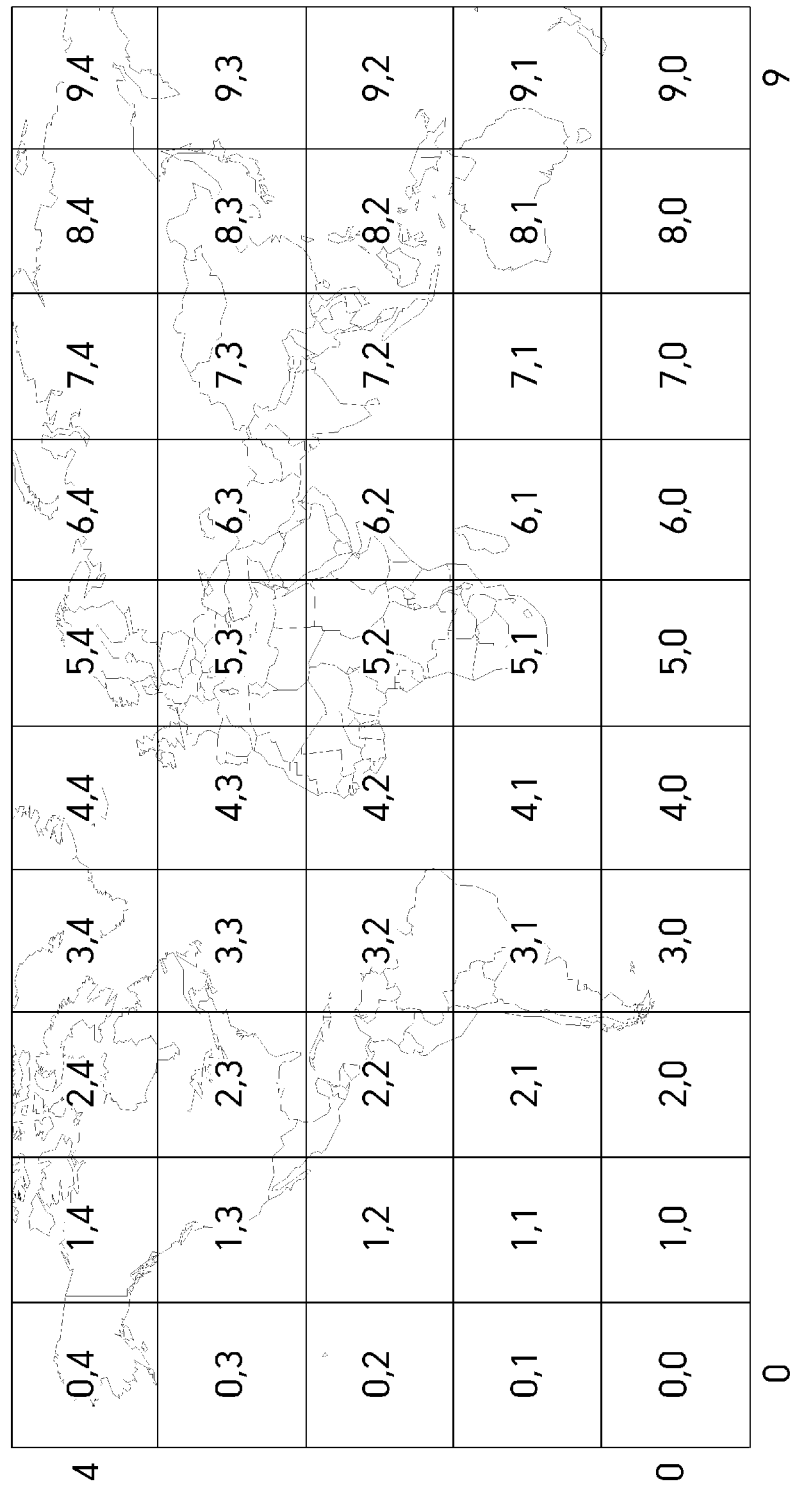
FIG. 1 is an exemplary diagram of a quadtree-based tile structure.
Figure 2A:
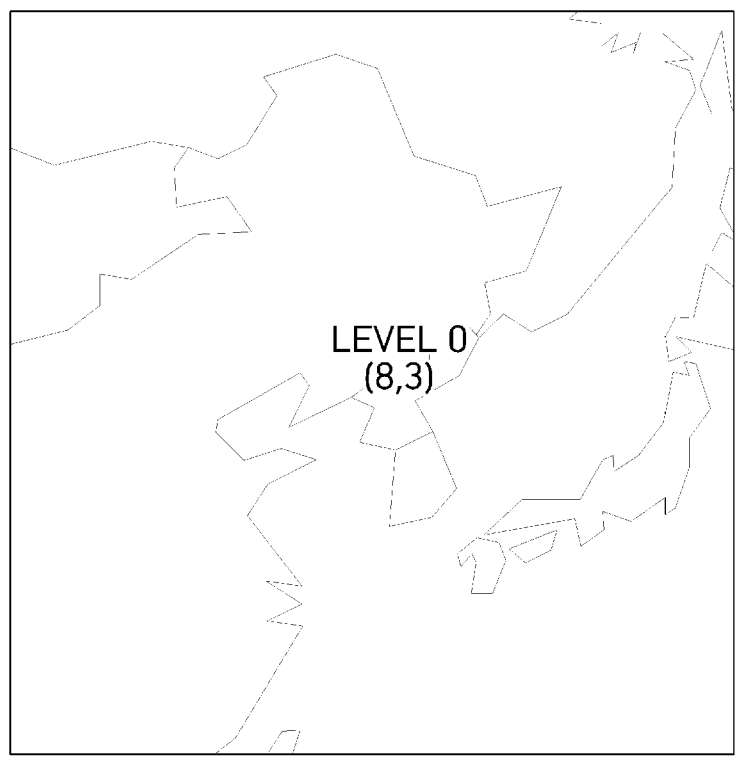
Figure 2B:
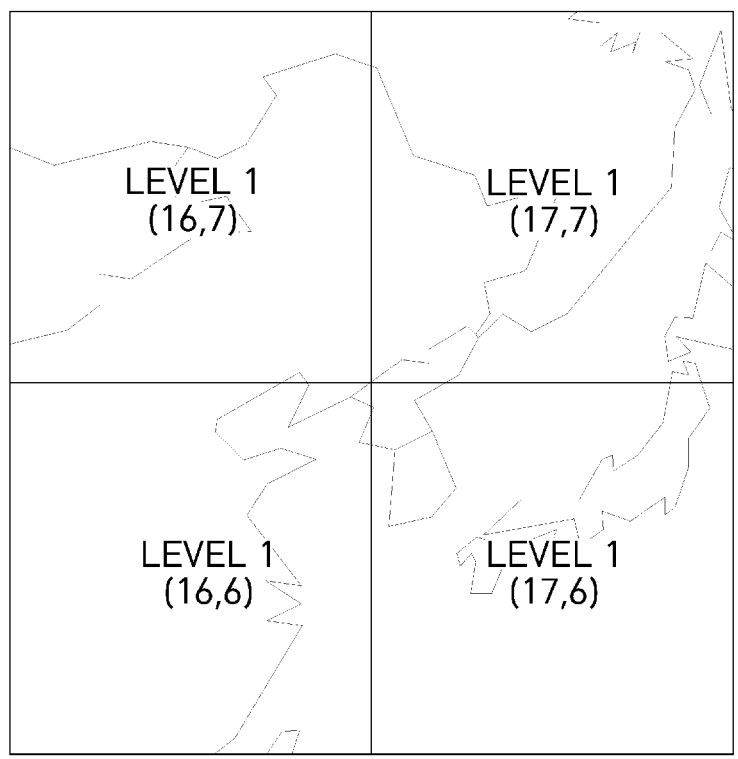

The advantages and characteristics of the present disclosure and a method for achieving the advantages and characteristics will be clearly understood through embodiments to be described in detail together with the accompanying drawings. However, the present disclosure is not limited to the following embodiments, but may be implemented in various forms different from each other, and the present embodiments are provided to bring the disclosure of the present disclosure to perfection and assist those skilled in the art to completely understand the scope of the present disclosure. Therefore, the present disclosure is defined only by the scope of the appended claims. Terms used in the present specification are used for describing embodiments, not limiting the present disclosure. In the present specification, a singular form also includes plural forms unless specifically mentioned. The "comprises" and/or "comprising" used in the specification does not exclude the presence or addition of one or more other components, steps, operations, and/or elements in addition to the mentioned components, steps, operations, and/or elements.

In describing the present disclosure, when it is determined that detailed descriptions of a related known technology may unnecessarily obscure the subject matter of the present disclosure, the detailed description thereof will be omitted.

Hereinafter, embodiments of the present disclosure will be described in detail with reference to the accompanying drawings. In describing the present disclosure, the same reference numbers will be used for the same means regardless of the reference numerals in order to facilitate the overall understanding.

Figure 3:
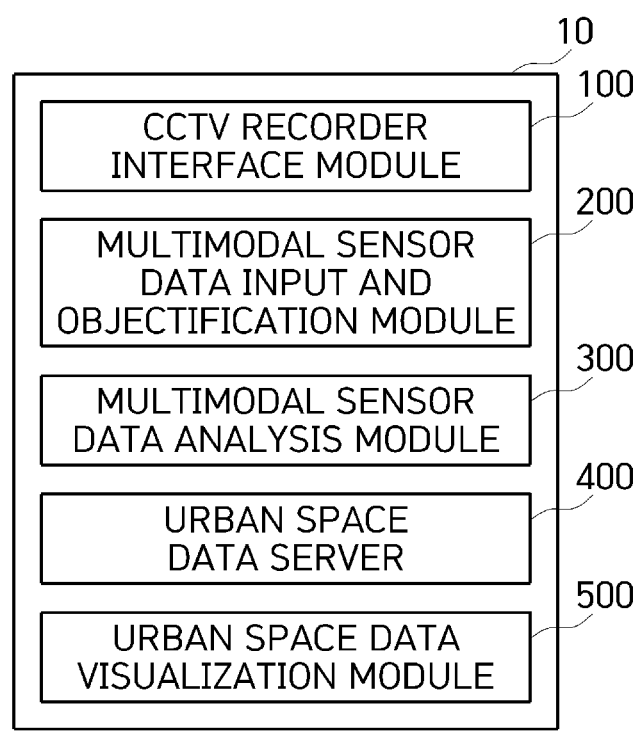
FIG. 3 is a block diagram illustrating the configuration of an urban digital twin platform system in accordance with an embodiment of the present disclosure.

FIG. 3 is a block diagram illustrating the configuration of an urban digital twin platform system 10 in accordance with an embodiment of the present disclosure.

The urban digital twin platform system 10 collects data from various sensor installed in a city and updates an urban digital twin model similar to the real world. The urban digital twin platform system 10 collects/analyzes sensor data from a plurality of heterogeneous sensors (multimodal sensors), and updates the urban digital twin model similar to the real world according to the result of the sensor data collection/analysis.

As illustrated in FIG. 3, the urban digital twin platform system 10 in accordance with an embodiment of the present disclosure includes a multimodal sensor data input and objectification module 200, a multimodal sensor data analysis module 300, and an urban space data storage/management server (hereinafter, 'urban space data server') 400.

Furthermore, the urban digital twin platform system 10 may further include a CCTV recorder interface module 100 in order to access image data of a CCTV recorder 1.

Furthermore, the urban digital twin platform system 10 may further include an urban space data visualization module 500 in order to reproduce data of the urban space data server 400.

Although not illustrated in FIG. 1, the urban digital twin platform system 10 may further include a CCTV recorder viewer and management module 600 in order to inquire and manage the image data of the CCTV recorder 1.

The CCTV recorder interface module 100 provides the multimodal sensor data input and objectification module 200 with an interface for accessing the image data stored in the CCTV recorder 1. The CCTV recorder interface module 100 collects the image data stored in the CCTV recorder 1 and transmits the collected image data to the multimodal sensor data input and objectification module 200.

The multimodal sensor data input and objectification module 200 detects a moving object from multimodal sensor data (heterogeneous sensor data) and generates data on the moving object (objectification data). The multimodal sensor data input and objectification module 200 transmits the objectification data to the multimodal sensor data analysis module 300. The multimodal sensor data input and objectification module 200 may collect data from sensors (hereinafter, 'other sensors 3') except for the CCTV recorder 1 and a traffic information system 2.

The multimodal sensor data analysis module 300 classifies basic actions of the moving object at a specific point in time on the basis of the objectification data, classifies complex actions of the moving object through situation analysis based on the basic actions of the moving object, and generates moving object information. The multimodal sensor data analysis module 300 uses a plurality of pieces of objectification data for a specific period in time, determines the basic actions of the moving object by using each objectification data, classifies (determines) the complex actions by analyzing a combination or sequence of the basic actions, and generates the moving object information. Then, the multimodal sensor data analysis module 300 transmits the objectification data and the analysis result (moving object information) to the urban space data server 400.

The urban space data server 400 stores the objectification data and the analysis result (moving object information) of the multimodal sensor data analysis module 300, and manages the stored data and information.

The urban space data visualization module 500 extracts the data and information, which are stored in the urban space data server 400, according to time and spatial conditions, and visualizes the extracted data and information. The urban space data visualization module 500 may reproduce static data such as buildings, roads, and terrain and dynamic data including a moving object such as a vehicle and a pedestrian according to various times or viewpoints.

The CCTV recorder viewer and management module 600 may output the image data stored in the CCTV recorder 1 on a screen that can be seen by a system user. The CCTV recorder viewer and management module 600 provides an inquiry function and a search function for the image data stored in the CCTV recorder 1. Furthermore, the CCTV recorder viewer and management module 600 provides a screen through which the system user may manage the CCTV recorder 1 and the image data stored in the CCTV recorder 1. This screen may include contents regarding maintenance of the CCTV recorder 1 or change, deletion, storage period, and storage capacity of the image data stored in the CCTV recorder 1.

Among the multimodal sensor data used in the urban digital twin platform system 10, image data are mainly collected from CCTVs. Image data collected by CCTVs installed in the city are recorded in the CCTV recorder 1. The CCTV recorder 1 is a storage device that collects and records the image data collected by the CCTVs, and is installed to cooperate with the CCTVs. A plurality of CCTVs may cooperate with one CCTV recorder 1. The CCTV recorder 1 may be, for example, a network video recorder (NVR), a digital video recorder (DVR), or the like. Moving object sensor data (or sensing information) mainly used in the urban digital twin platform system 10 in accordance with an embodiment of the present disclosure is brought through the CCTV recorder interface module 100 accessible to the image data stored in the CCTV recorder 1. The multimodal sensor data input and objectification module 200 determines the presence or absence of an object to be analyzed in data directly collected from heterogeneous (multimodal) sensors or CCTV image data acquired through the CCTV recorder interface module 100, and determines whether to analyze the object to be analyzed. The multimodal sensor data input and objectification module 200 detects a moving object (movable object) to be analyzed from the multimodal sensor data, and generates objectification data. The objectification data is a refined form of the multimodal sensor data, and is data organized in units of analysis targets (objects). The multimodal sensor data analysis module 300 receives a plurality of pieces of objectification data corresponding to a specific period in time from the multimodal sensor data input and objectification module 200, generates information by adding situation analysis result information (moving object information) to continuous objectification data in order to update an actual urban digital twin model, and transmits the generated information to the urban space data server 400. The urban space data server 400 stores and manages data of a digital twin-based platform. That is, the urban space data server 400 stores and manages the objectification data (including the continuous objectification data) and the moving object information. The data and information stored in the urban space data server 400 may be temporally and spatially reproduced through the urban space data visualization module 500. Furthermore, the urban space data visualization module 500 has a function capable of analyzing a complex phenomenon, beyond analyzing a single object phenomenon or thing, by using the analysis result of the multimodal sensor data analysis module 300. Examples of the analysis may include an analysis of the correlation between disasters such as fire or building collapse and traffic conditions, an analysis of the correlation between an increase in fine dust concentration and traffic situations, an analysis of the correlation between energy and environments, and the like. The urban space data visualization module 500 transmits the complex phenomenon analysis result to the urban space data server 400, and the urban space data server 400 stores and manages the received complex phenomenon analysis result. Furthermore, the urban space data visualization module 500 may transmit the complex phenomenon analysis result to the multimodal sensor data analysis module 300, and the multimodal sensor data analysis module 300 may use the complex phenomenon analysis result in a situation analysis (object complex action derivation) process.

An urban digital twin platform building technology using video acquisition devices installed in urban spaces and various IoT sensor devices can be used for analysis and simulation for solving problems due to urbanization. The difference between the present disclosure and the existing urban digital twin is that the urban digital twin platform system 10 in accordance with the present disclosure may collect and analyze data on an object whose position is not fixed. In the present disclosure, an object whose position may change over time is defined as a 'moving object'. The urban digital twin platform system 10 in accordance with an embodiment of the present disclosure mainly uses camera sensors in order to collect data on a moving object. Examples of the camera sensors include CCTVs. As the camera sensors, black boxes or other cameras other than the CCTVs may be used (in the case of camera sensors other than the CCTVs, such as black boxes, they are regarded as the other sensors 3, and the other sensors 3 directly provide collected data to the multimodal sensor data input and objectification module 200). The urban digital twin platform system 10 in accordance with an embodiment of the present disclosure collects data provided by other sensors (for example, fine dust sensors, temperature sensors, humidity sensors) installed in the city and uses the data for urban phenomenon analysis, in order to expand an urban phenomenon analysis range limited to the camera sensors. For example, when traffic signal information collected from a public database (for example, the traffic information system 2) is added to image data obtained by capturing a car accident scene, it may be helpful to understand the situation before and after the accident. Furthermore, when the urban digital twin platform system 10 in accordance with the present disclosure is used, other traffic-related laws (for example, lanes and speed limit) of an accident site may be checked directly without going to the site.

The urban digital twin platform system 10 may collect data and information from various external sensors, systems, and databases. The urban digital twin platform system 10 may access the CCTV recorder 1 through the CCTV recorder interface module 100, and collect CCTV image data stored in the CCTV recorder 1. Furthermore, in the urban digital twin platform system 10, the multimodal sensor data analysis module 300 may collect traffic information (for example, traffic signal information, traffic accident information, public transportation operation information, and road network data) provided by the traffic information system 2 and use the collected traffic information in order to analyze the situation of moving objects. The traffic information system 2 collectively refers to a system capable of providing traffic information from the outside of the urban digital twin platform system 10 in accordance with the present disclosure, and examples thereof may include a comprehensive traffic control system, a traffic management system, intelligent transport systems (ITS) or cooperative-intelligent transport systems (C-ITS), and the like. Furthermore, the urban digital twin platform system 10 may collect data from other multimodal sensors (for example, black boxes, various IoT sensors, temperature sensors, humidity sensors, and fine dust sensors) other than CCTVs. The multimodal sensors other than the CCTVs are collectively referred to as the other sensors 3. The urban digital twin platform system 10 collects data from the other sensors 3 through the multimodal sensor data input and objectification module 200.

In another embodiment of the present disclosure, the multimodal sensor data input and objectification module 200 may include the CCTV recorder interface module 100. In such a case, the multimodal sensor data input and objectification module 200 may access the CCTV recorder 1 and collect data of images captured by the CCTV.

Figure 4:
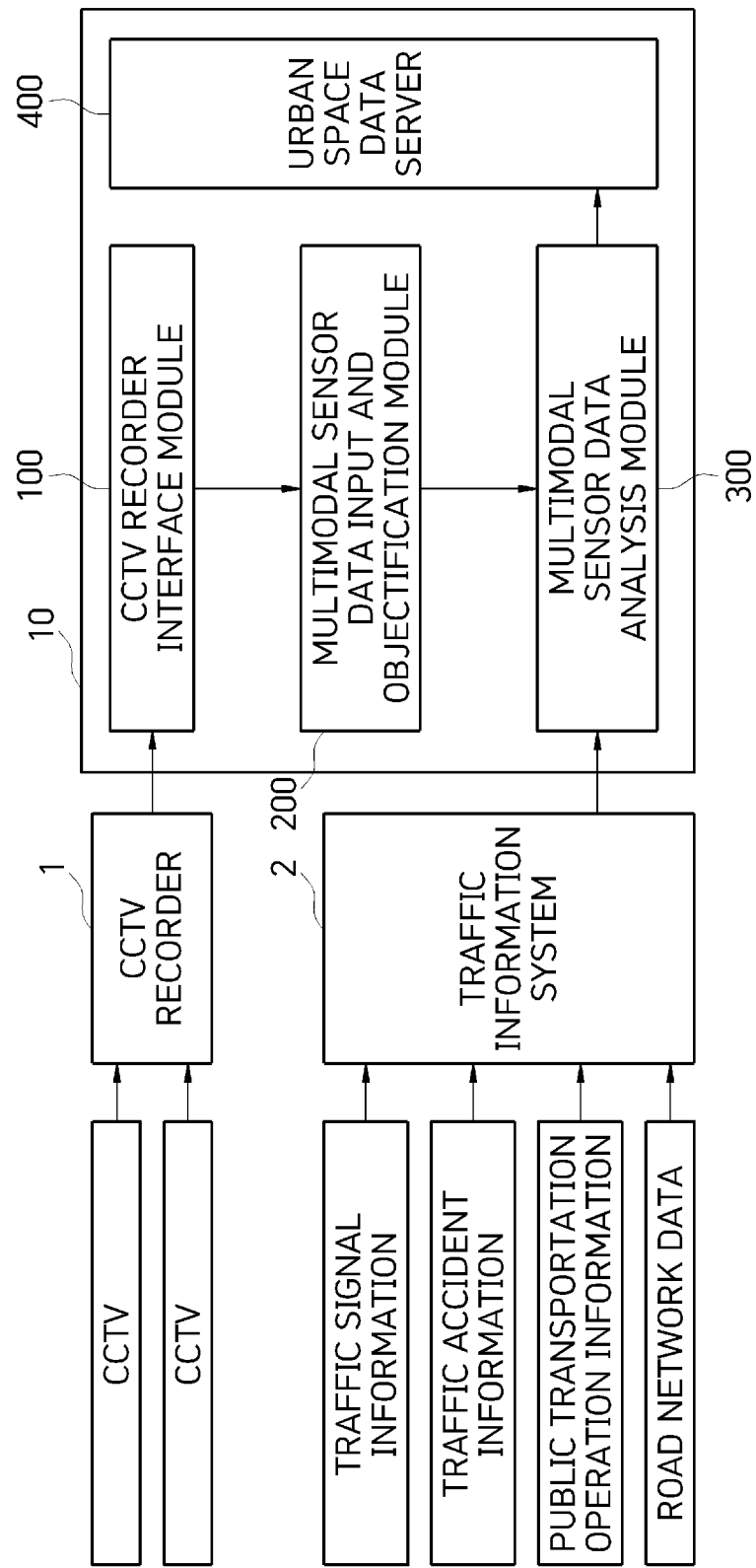
FIG. 4 is a diagram illustrating collection paths in the case of collecting CCTV and traffic information in accordance with an embodiment of the present disclosure.

FIG. 4 is a diagram illustrating collection paths in the case of collecting CCTV and traffic information in accordance with an embodiment of the present disclosure.

In the embodiment illustrated in FIG. 4, the CCTV recorder 1 stores and manages image data of CCTVs connected in a wired or wireless manner. The CCTV recorder 1 has an API for providing data. The CCTV recorder interface module 100 collects CCTV image data by using the API that can access the CCTV recorder 1. A plurality of CCTV recorder interface modules 100 may be connected to import data from image data stored in a plurality of CCTV recorders 1. Since it is inefficient for the urban digital twin platform system 10 to store and manage all image data collected by tens or hundreds of CCTVs, the urban digital twin platform system 10 in accordance with an embodiment of the present disclosure converts images of CCTVs into objects and converts the objects into a form that can be managed by the urban space data server 400.

In an embodiment of the present disclosure illustrated in FIG. 4, the CCTV recorder 1 stores and manages data of images by the CCTVs. The CCTV recorder interface module 100 accesses the CCTV recorder 1 using the API, collects the image data stored in the CCTV recorder 1, and transmits the CCTV image data to the multimodal sensor data input and objectification module 200. The multimodal sensor data input and objectification module 200 detects a moving object from the image data, generates data in units of objects (generates objectification data), and transmits the generated objectification data to the multimodal sensor data analysis module 300. The multimodal sensor data analysis module 300 receives traffic information (for example, traffic signal information, traffic accident information, public transportation operation information, and road network data) from the traffic information system 2. The multimodal sensor data analysis module 300 combines the objectification data and traffic information matching the objectification data, and generates moving object information through situation analysis. The multimodal sensor data analysis module 300 transmits the objectification data and the moving object information generated on the basis of the objectification data to the urban space data server 400. The urban space data server 400 stores and manages the objectification data and the moving object information.

The multimodal sensor data input and objectification module 200, the multimodal sensor data analysis module 300, and the urban space data server 400, which are components of the urban digital twin platform system 10 as illustrated in FIG. 3, will be described in detail below.

Figure 5:
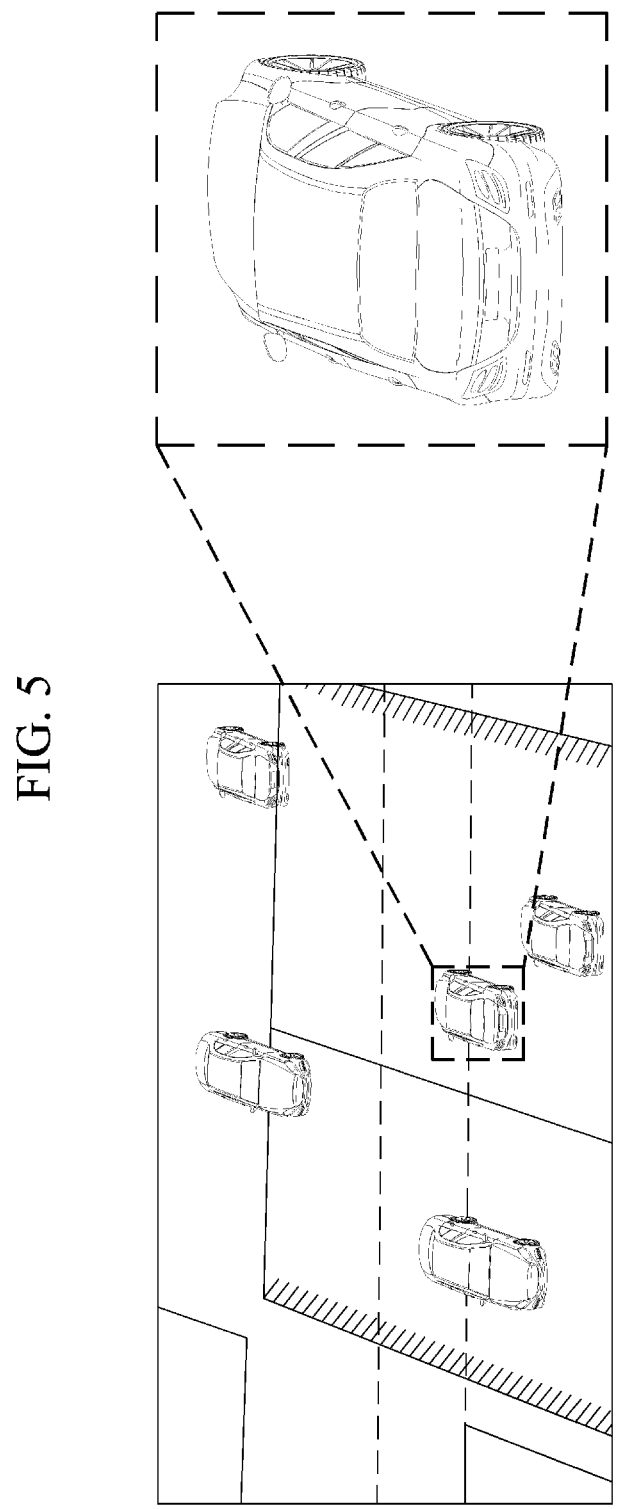
FIG. 5 is a diagram illustrating an example of a moving object detected in a CCTV image.

The multimodal sensor data input and objectification module 200 detects a moving object from heterogeneous sensor data, and generates objectification data that is data on the moving object. The 'objectification' refers to an operation in which the multimodal sensor data input and objectification module 200 detects objects from multimodal sensor data, and classifies the objects, and generates data in units of objects. FIG. 5 is a diagram illustrating an example of a moving object detected in the CCTV image.

Table 1 below is an example of the result (objectification data) in which the multimodal sensor data input and objectification module 200 detects a moving object from multimodal sensor data and performs objectification. The multimodal sensor data analysis module 300 does not use the CCTV image as is, and analyzes a traffic situation by referring to objectification data such as Table 1 below, traffic signal information, traffic accident information, public transportation operation information, road network data, and the like. In Table 1 below, local ID indicates an identification system for an object. The local ID may include numbers or letters, or a combination of numbers and letters. The objectification data may include camera ID, local ID, type, position, time, direction, and speed as shown in Table 1 below, but is not necessarily limited thereto. In the configuration of Table 1 below, objectification data with added, changed, or deleted items may be generated. In Table 1 below, 'direction' is a unit vector indicating a direction. That is, a number in the item 'direction' of the objectification data in Table 1 below is a vector with a magnitude of 1 and only a direction without a position. The objectification data may include movement direction data of an object in the form of a unit vector.

TABLE 1

| | |
|---|---|
| Camera ID | 2580-1 |
| Local ID | 034 |
| Type | Car |
| Position | (127.38500, 36.35111, 15.4) |
| | (Longitude/latitude/altitude) |

TABLE 1-continued

| Time | Year:Month:Day:Hour:Minute:Second:Frame |
|---|---|
| Direction | 2021:07:02:13:54:35:01 |
| | (0.97, 0.24, 0.06) |
| Speed | 15 km/h |

Data used when the multimodal sensor data input and objectification module 200 performs objectification may be CCTV image data input from the CCTV recorder interface module 100. When objectification is performed, one frame is used for image data. That is, the multimodal sensor data input and objectification module 200 may receive one frame (2D image) of the CCTV image data.

The multimodal sensor data input and objectification module 200 may detect a moving object such as a vehicle or a pedestrian in one frame (2D image) of the CCTV image data. That is, the multimodal sensor data input and objectification module 200 may detect an object for each frame of the image data. The multimodal sensor data input and objectification module 200 may detect a moving object such as a vehicle or a pedestrian on the basis of the position, horizontal length, and vertical length of an object in a 2D image by using a deep learning-based multi-object tracking technology. Then, the multimodal sensor data input and objectification module 200 may determine what the detected moving object is. For example, the multimodal sensor data input and objectification module 200 may determine whether the detected moving object corresponds to a pedestrian, a bicycle, a car, a truck, or a bus.

The multimodal sensor data input and objectification module 200 may acquire position data by detecting the position of a moving object on the sensor data. For example, the multimodal sensor data input and objectification module 200 may obtain coordinates (position vectors) in which the position of the moving object includes (longitude, latitude, and altitude). In the case of detecting the position of a moving object by using CCTV image data, it is based on the premise that a region captured by a CCTV camera has been surveyed, and the CCTV camera has been calibrated in advance. Under such a premise, the multimodal sensor data input and objectification module 200 may obtain the position vectors of the moving object, that is, position data, by converting (mapping) pixel coordinates where the object is located in the CCTV image data (2D image) into (longitude, position, and altitude).

Furthermore, the multimodal sensor data input and objectification module 200 may acquire direction data (direction vectors) and speed data by detecting the movement direction and speed of the object on the sensor data. The multimodal sensor data input and objectification module 200 may calculate (estimate) the movement direction and speed of the object by using the position data. When the multimodal sensor data input and objectification module 200 uses a position vector including (longitude, position, and altitude), the dimensions of the movement direction and speed of the object become three-dimensional. When estimating the three-dimensional movement direction and speed of a moving object by using the CCTV image data, the multimodal sensor data input and objectification module 200 refers to objectification data of a previous frame of the same object. When there is no previous frame, the multimodal sensor data input and objectification module 200 does not estimate the movement direction and speed data of the object.

On the other hand, the multimodal sensor data input and objectification module 200 transmits the multimodal sensor data to the urban space data server 400. The urban space data server 400 stores and manages the received sensor data on the basis of tiles.

The multimodal sensor data analysis module 300 classifies complex actions of the moving object through situation analysis based on the objectification data, and generates moving object information. The 'situation analysis (object information analysis)' refers to an operation of generating information in units of objects that can be used as a basis for determination or decision-making by combining the objectification data and information collected from the outside. The multimodal sensor data analysis module 300 receives the objectification data and analyzes a situation (for example, a traffic situation). The present disclosure provides examples of basic actions and complex actions (traffic situations) that an objectified vehicle may take. However, the type of object and the type of situation are not limited thereto. For example, the multimodal sensor data analysis module 300 may perform situation analysis on other moving objects, such as pedestrians or bicycles. Furthermore, the multimodal sensor data analysis module 300 may analyze situations such as environments, energy, disasters, and safety in addition to the traffic situations.

The multimodal sensor data analysis module 300 receives the objectification data from the multimodal sensor data input and objectification module 200 for the purpose of an object situation analysis (for example, a traffic situation analysis). The multimodal sensor data input and objectification module 200 may transmit data collected by the other sensors 3 in addition to the objectification data to the multimodal sensor data analysis module 300. When receiving objectification data of a moving object generated on the basis of image data, the multimodal sensor data analysis module 300 defines an object detected in successive frames of the same sensor as the same object. The same local ID is given to the same object. Thereafter, the multimodal sensor data analysis module 300 classifies complex actions of the same object through situation analysis.

The multimodal sensor data analysis module 300 collects information related to the object from the outside. For example, the multimodal sensor data analysis module 300 may collect traffic information (for example, traffic signal information, traffic accident information, public transportation operation information, and road network data) corresponding to the same position as an objectified vehicle from the traffic information system 2. Furthermore, the multimodal sensor data analysis module 300 may collect situation data corresponding to the same position as the objectified vehicle from the other sensors 3 through the multimodal sensor data input and objectification module 200 and use the situation data for analysis.

On the other hand, the multimodal sensor data analysis module 300 may infer complex actions of an object by using a complex phenomenon analysis result provided by the urban space data visualization module 500. The multimodal sensor data analysis module 300 may infer complex actions of an object by using a complex phenomenon occurring in a partial region or all regions of the city as a condition. For example, separate complex actions may be defined by associating policy that restricts the passage of a specific road at a certain period and an event in which a moving object collides with another object.

The multimodal sensor data analysis module 300 classifies basic actions of an object. When the objectification data is data generated on the basis of image data, the multimodal sensor data analysis module 300 classifies basic actions for each frame of an objectified vehicle. In one frame, an object can be classified into two or more basic actions. For example, two or more basic actions of a vehicle (indicating an objectified vehicle) may be combined in one frame. An example of a combination of the basic actions of a vehicle may include a case in which the vehicle decelerates or accelerates in a left-turning state. For basic action classification of the objectified vehicle, the multimodal sensor data analysis module 300 may use the objectification data as well as at least one of multimodal sensor data, traffic signal information, traffic accident information, public transportation operation information, and road network data. Table 2 below shows examples of basic actions of a vehicle.

TABLE 2

| Basic action | Description |
| --- | --- |
| Move straight | Vehicle moves in lane direction |
| Move backward | Vehicle moves in lane direction |
| Acceleration | Vehicle speed increases |
| Deceleration | Vehicle speed decreases |
| Brake light | Vehicular brake light is on |
| Lane change (left) | Vehicle changes lanes to left |
| Lane change (right) | Vehicle changes lanes to right |
| Waiting for signal | Vehicle stops due to waiting for signal at intersection or crosswalk |
| Stop | When vehicle is decelerating, speed becomes zero |
| Move straight at intersection | Vehicle moves straight at intersection |
| Turn right at intersection | Vehicle turns right at intersection |
| Turn left at intersection | Vehicle turns left at intersection |
| Collision | Collision with other objects (vehicles, pedestrians, bicycles, traffic facilities, etc.) |
| Direction indication (left) | Left turn signal flashes or driver gives hand signal |
| Direction indication (right) | Right turn signal flashes or driver gives hand signal |
| Emergency light | Vehicular emergency light flashes |

The multimodal sensor data analysis module 300 classifies complex actions of the object on the basis of the classification result of the basic actions of the object. The multimodal sensor data analysis module 300 classifies complex actions with respect to the same object. That is, the multimodal sensor data analysis module 300 classifies the complex actions with respect to the same local ID through situation analysis. When the objectification data has been generated on the basis of image data, the basic actions of the objectified vehicle change in successive frames, and the multimodal sensor data analysis module 300 may classify complex actions of the objectified vehicle according to the frame change. That is, the multimodal sensor data analysis module 300 combines the basic actions of the object for each frame and external information (for example, traffic information and situation information), and classifies the complex actions of the object through situation analysis. For example, the multimodal sensor data analysis module 300 may estimate the traffic situation of 'overtaking' by combining 'lane change' and 'acceleration', which are basic actions of a vehicle. The multimodal sensor data analysis module 300 may analyze various traffic situations by using at least one of a plurality of basic actions of an object classified in successive frames, the position of the object, various multimodal sensor data, traffic signal information, traffic accident information, public transportation operation information, and road network data, or combining a plurality of pieces of data or information. Table 3 below presents an example of the situation analysis of a vehicle. Specifically, Table 3 below summarizes results of estimating complex actions of the vehicle by combining basic actions of the vehicle and traffic information.

TABLE 3

| Complex action (situation) | Configuration | Description |
| --- | --- | --- |
| Overtaking (same lane) | ① Direction indication + lane change<br>② Acceleration<br>③ Direction indication + lane change | When there is vehicle in front of same lane, overtake vehicle by changing lanes |
| Overtaking (same lane)-no direction indication | ① Lane change<br>② Acceleration<br>③ Lane change | Changing lanes without giving direction when overtaking |
| Collision accident after turning left in straight lane at intersection | ① Place (Straight Lane) + Place (Left Lane Straight Left)<br>② Traffic light (change from stop to move straight-turn left at the same time signal)<br>③ Acceleration + turn left<br>④ Collision | In case of turning left in two-lane straight lane at intersection and colliding with vehicle moving straight ahead in left straight & left turn lane |
| Sudden stop due to signal change at intersection | ① Place (intersection ahead)<br>② Traffic light (change to yellow light)<br>③ Deceleration<br>④ Stop | When traffic light changes to yellow light and vehicle entering intersection suddenly stops |

The multimodal sensor data analysis module 300 transmits the objectification data and the analysis result (object information) to the urban space data server 400. The situation analysis result (object information) refers to basic actions and complex actions (situations) for the same object. Table 4 below is an example of objectification data for which the complex action classification of the same object has been completed in successive frames when the objectification data has been generated on the basis of image data. The multimodal sensor data analysis module 300 transmits the objectification data (combination of the objectification data and the object information), for which the complex action classification of the same object has been completed as shown in Table 4 below, to the urban space data server 400.

TABLE 4

| | |
| --- | --- |
| Camera ID | 2580-1 |
| Local ID | 034 |
| Type | Car |
| Position | (127.38500, 36.35111, 15.4),<br>(127.38500, 36.35112, 15.4),<br>. . . ,<br>(127.38501, 36.35112, 15.5)<br>(Longitude/latitude/altitude) |
| Time | 2021:07:02:13:54:35:01~<br>2021:07:02:13:54:35:15<br>Year:Month:Day:Hour:Minute:Second:Frame |

TABLE 4-continued

| | |
|---|---|
| Direction | (0.97, 0.24, 0.06), |
| | (0.96, 0.26, 0.04), |
| | ..., |
| | (0.94, 0.34, 0.03) |
| Speed | 15, 15.1, ..., 15.4 km/h |
| Basic action | Move straight, move straight, ..., enter intersection, slow down + turn left |
| Complex action (Situation) | After entering intersection, turn left while decelerating |

In Table 4 above, the local ID means the same object detected in successive frames of data of images captured by a CCTV camera corresponding to the same camera ID. When an object is not detected in successive frames, the object is regarded as another object and a different local ID is assigned thereto accordingly. The multimodal sensor data analysis module 300 analyzes complex actions of an object with the same local ID. Accordingly, objectified information (object information) of the analysis target may include one frame, but may also include two or more frames. Position, direction, and speed have as many data as the number of frames. In one frame, an object may be classified into two or more basic actions. For example, two or more basic actions of a vehicle (indicating an objectified vehicle) may be combined in one frame. An example of a combination of basic actions of the vehicle may include a case in which the vehicle decelerates or accelerates in a left-turning state. For basic action classification of the objectified vehicle, the multimodal sensor data analysis module 300 may use at least one of position information of the vehicle, multimodal sensor data, traffic signal information, traffic accident information, public transportation operation information, and road network data. The multimodal sensor data analysis module 300 may perform situation analysis based on the basic actions of the object classified in successive frames, the position of the object, road traffic network data, traffic light information, and the like.

Figure 6:
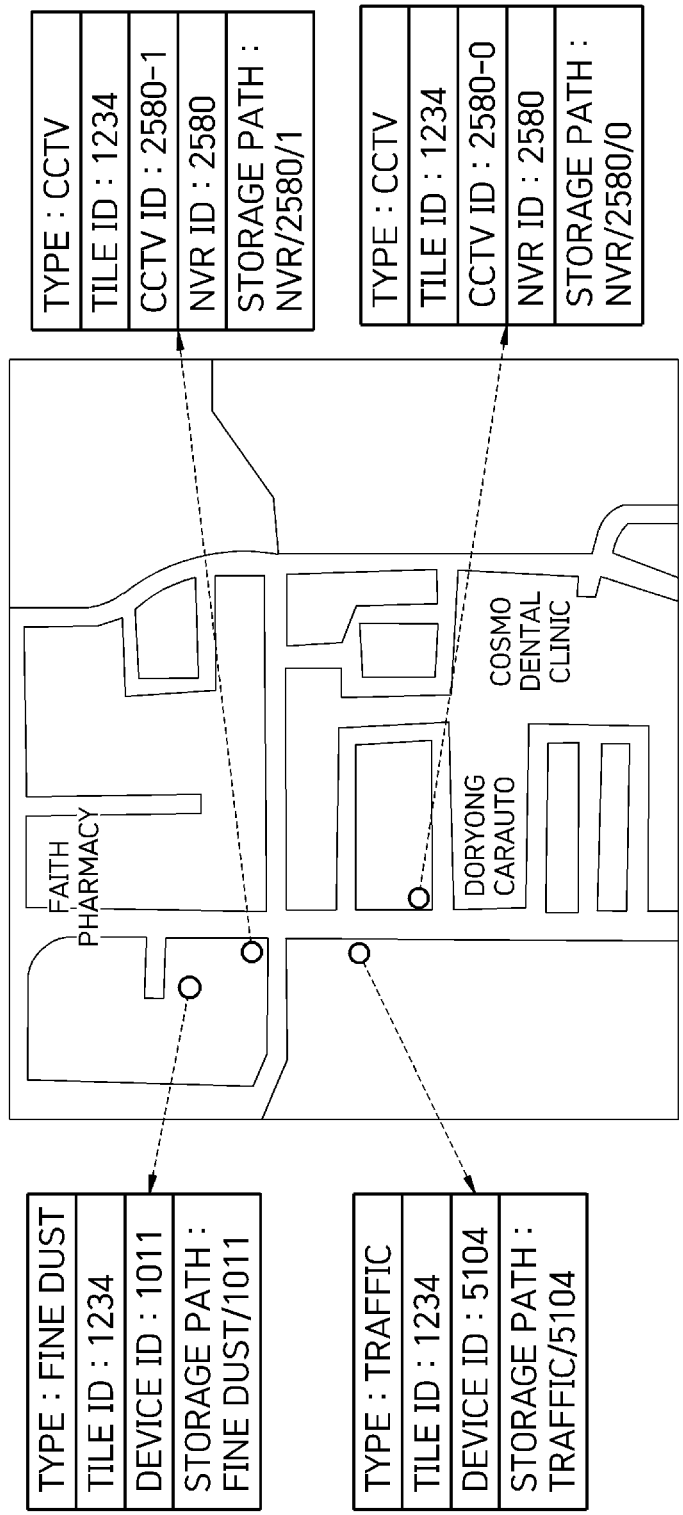
FIG. 6 is a diagram illustrating an example of tile-based data management.

The urban space data server 400 stores static spatial information data provided from an external system and the multimodal sensor data received from the multimodal sensor data input and objectification module 200. The criterion (principle) by which the urban space data server 400 stores and manages data is position information. The urban space data server 400 divides the entire territory into tiles as illustrated in FIG. 6, and stores static spatial information data such as terrain, buildings, roads, and facilities according to tile standards. The urban space data server 400 stores dynamic multimodal sensor data on the basis of the position of a sensor. The urban space data server 400 stores data collected by sensors for measuring temperature, humidity, fine dust, and the like, on the basis of attachment positions of the sensors. The CCTV image data may also be stored in the urban space data server 400 if necessary, but for the storage space management and efficient information processing of the urban digital twin platform system 10, the CCTV image data is not stored in the urban space data server 400, but only mapping information with the CCTV recorder 1 for storing the CCTV image data is preferably stored in the urban space data server 400. In this case, the urban space data server 400 stores and manages only the objectification data and the moving object information that is an analysis result.

Table 5 below is an example of tile-based data management. For example, when a tile ID is 1234, a corresponding tile has a data list as metadata in advance as shown in Table 5 below. When a user designates a region to be analyzed, the urban space data server 400 configures data on the basis of tiles included in the corresponding region. The urban space data server 400 may import a data list including various data items collected from a multimodal sensor included in the tile through the tile ID of the tile included in the designated region.

TABLE 5

| Tile ID: 1234 | |
|---|---|
| Data name | Position |
| Aerial image | Aerial/1234 |
| Basic image | Basic/1234 |
| DEM | DEM/1234 |
| CCTV | NVR/2580/0, NVR/2580/1 |
| Traffic | Traffic/5104 |
| Fine dust | FineDust/1011 |

The urban space data server 400 stores object information (object information of a moving object is referred to as 'moving object information') generated as a result of the situation analysis of the multimodal sensor data analysis module 300 together with the objectification data. The urban space data server 400 receives the objectification data and the analysis result (object information) from the multimodal sensor data analysis module 300. The urban space data server 400 stores the objectification data and the analysis result (object information) in a position-based tile. In such a case, not the position of the object, but the installation position of a sensor having collected object data (having detected the object) is used as a reference. When metadata of a corresponding tile is changed such as additional installation or removal of a sensor, the urban space data server 400 updates the metadata.

Figure 7A:
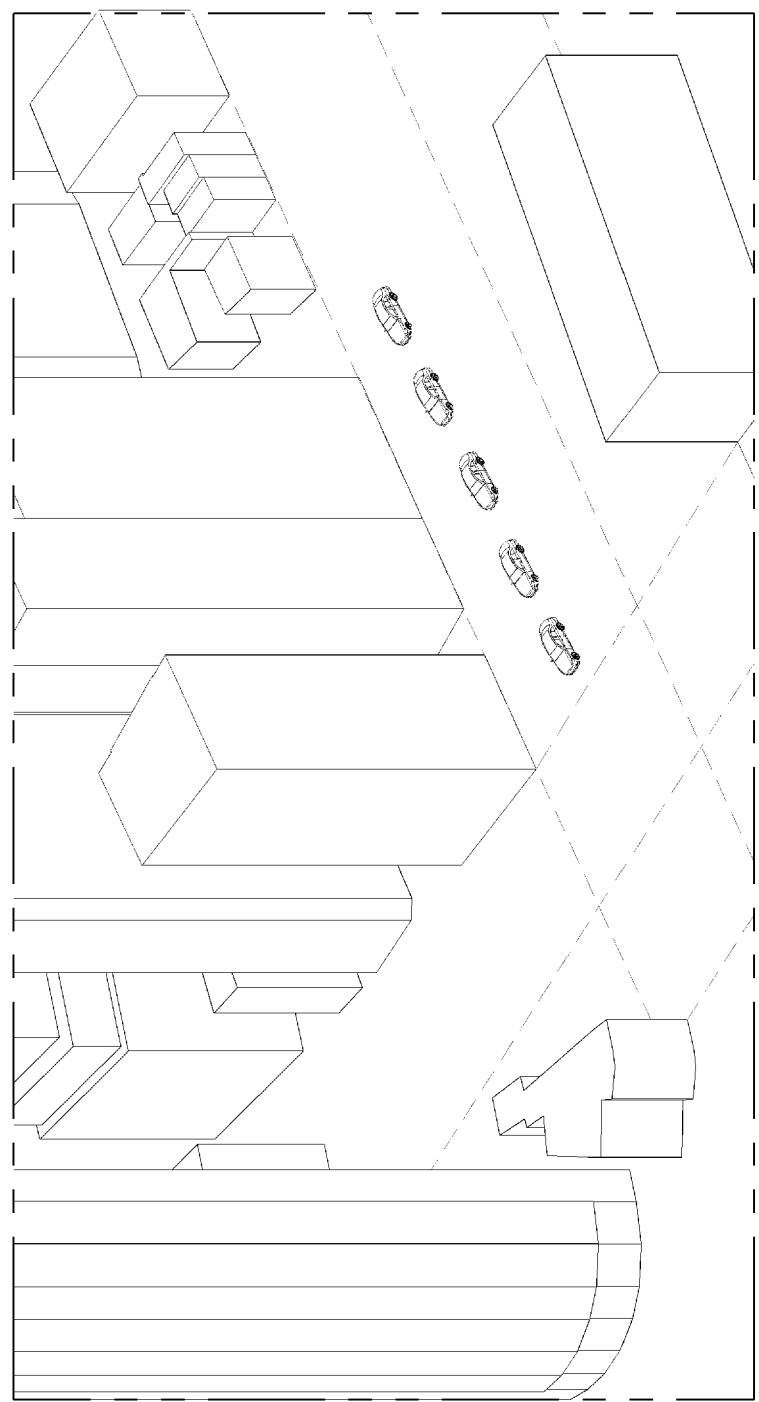
FIG. 7A and FIG. 7B are exemplary diagrams of digital twin-based data visualization.
Figure 7B:
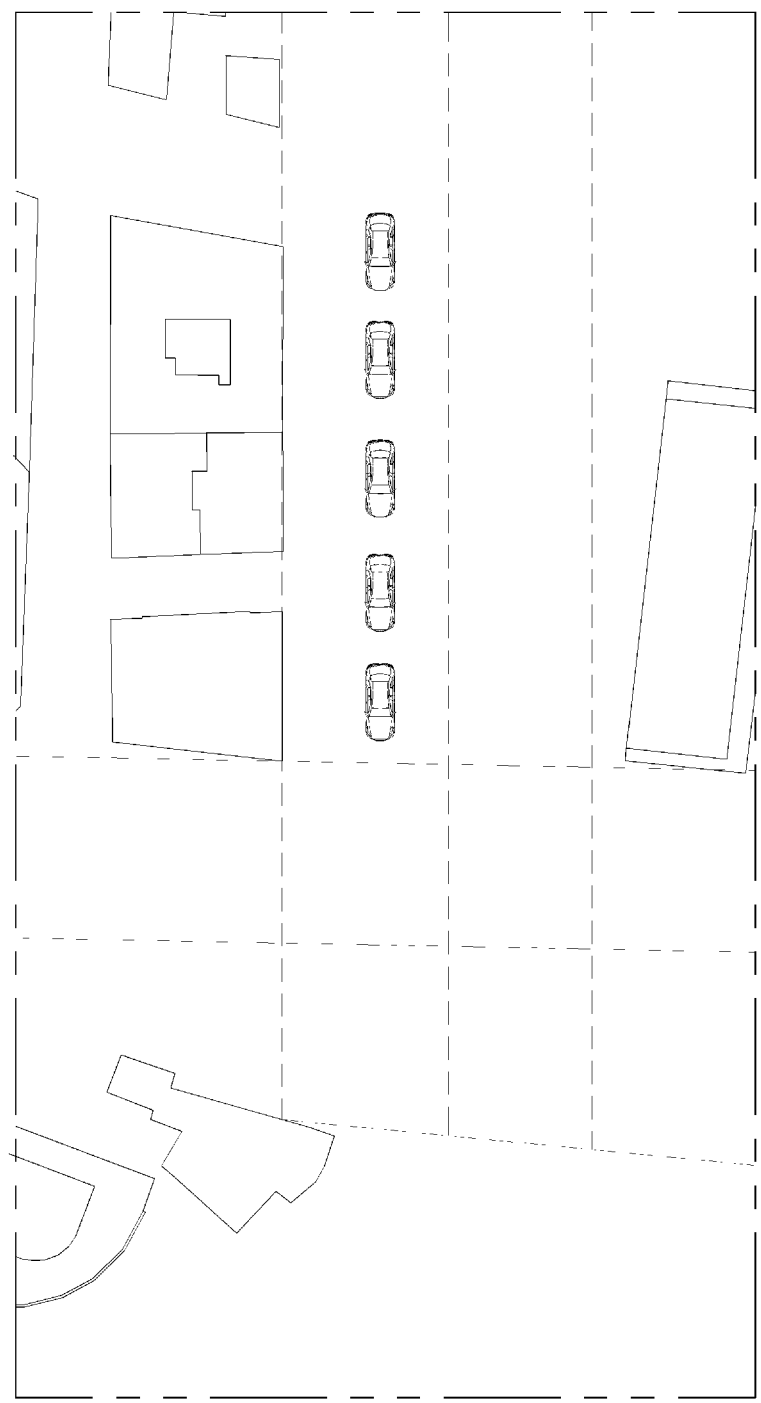

FIG. 7A and FIG. 7B are exemplary diagrams of digital twin-based data visualization. The urban space data visualization module 500 extracts and visualizes data and information stored in the urban space data server 400, according to time and spatial conditions. The urban space data visualization module 500 may extract data on the basis of tiles from the urban space data server 400 and visualize the extracted data into a 3D image as illustrated in FIG. 7A and FIG. 7B. The urban space data visualization module 500 in accordance with an embodiment of the present disclosure may reproduce static data such as buildings, roads, and terrain and dynamic data including moving objects such as vehicles and pedestrians according to various times or viewpoints.

Figure 8:
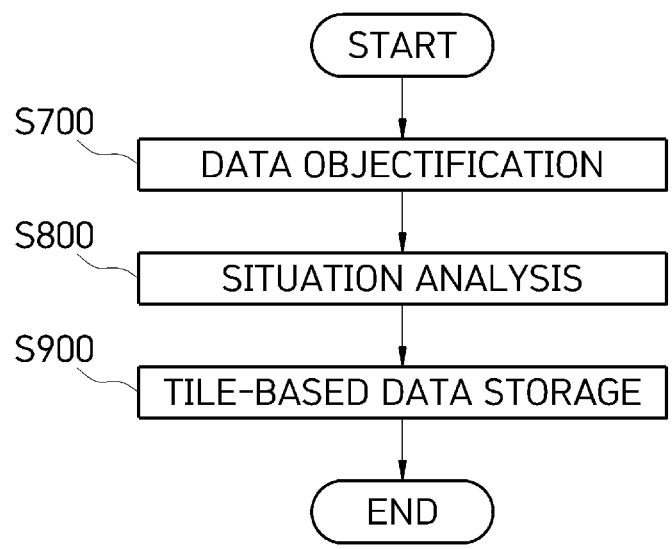
FIG. 8 is a flowchart for explaining a moving object information analysis and management method in accordance with an embodiment of the present disclosure.

FIG. 8 is a flowchart illustrating a moving object information analysis and management method in accordance with an embodiment of the present disclosure.

Step S700 is a data objectification step. This step is a step of detecting a moving object from multimodal sensor data (heterogeneous sensor data) and generating data on the moving object (objectification data). The multimodal sensor data input and objectification module 200 receives multimodal sensor data from the CCTV recorder interface module 100 or the other sensors 3, detects the moving object from the multimodal sensor data, and classifies the moving object. Then, the multimodal sensor data input and objectification module 200 configures (generates) objectification data by acquiring position data, direction data, and speed data of the moving object from the sensor data.

Step S800 is a situation analysis step. This step is a step of classifying basic actions of the object at a specific point in time on the basis of the objectification data, classifying complex actions of the object through situation analysis based on the basic actions of the object, and generating object information. The multimodal sensor data analysis module 300 receives the objectification data from the multimodal sensor data input and objectification module 200 for the purpose of an object situation analysis (for example, a traffic situation analysis). Furthermore, the multimodal sensor data analysis module 300 may receive data collected by the other sensors 3 through the multimodal sensor data input and objectification module 200. Furthermore, the multimodal sensor data analysis module 300 collects object-related information corresponding to the objectification data from the outside. For example, the multimodal sensor data analysis module 300 may collect traffic information (for example, traffic signal information, traffic accident information, public transportation operation information, and road network data) corresponding to the same position as an objectified vehicle from the traffic information system 2. The multimodal sensor data analysis module 300 classifies the basic actions and the complex actions of the object on the basis of the received or collected data and information. The multimodal sensor data analysis module 300 generates object information by classifying the basic actions and the complex actions of the object. The multimodal sensor data analysis module 300 transmits continuous objectification data and analysis results (object information) of the same object to the urban space data server 400.

Step S900 is a tile-based data storage step. This step isa step of storing the objectification data and the object analysis results (object information). The urban space data server 400 receives the objectification data and the analysis results (object information) form the multimodal sensor data analysis module 300. The urban space data server 400 stores the objectification data and the analysis results (object information) in a position-based tile. In such a case, not the position of the object, but the installation position of a sensor having collected object data (having detected the object) is used as a reference. When metadata of a corresponding tile is changed such as additional installation or removal of a sensor, the urban space data server 400 updates the metadata.

Figure 9:
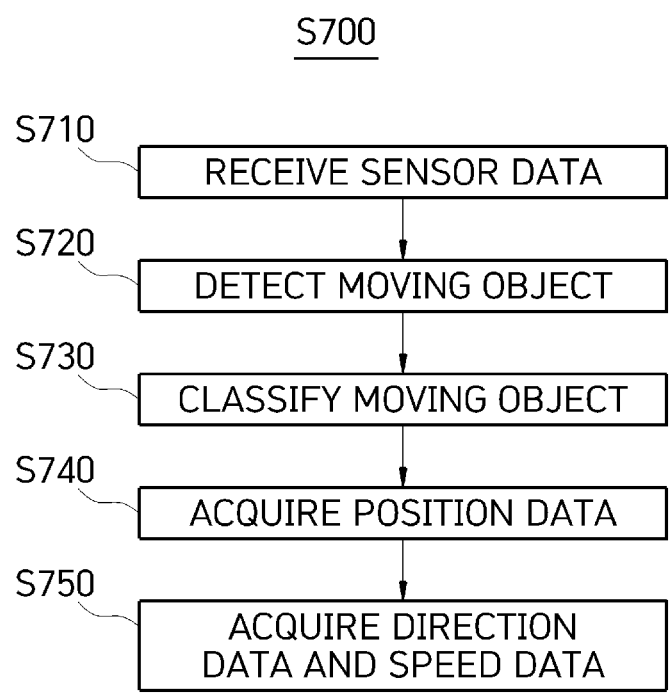
FIG. 9 is a flowchart for explaining a data objectification method in accordance with an embodiment of the present disclosure.

FIG. 9 is a flowchart illustrating a data objectification method in accordance with an embodiment of the present disclosure. The data objectification method is a method used in step S700 of FIG. 8 and includes steps S710, S720, S730, S740, and S750.

As described above, the 'data objectification' refers to an operation of detecting objects from the multimodal sensor data, and classifying the objects, and generating data in units of objects, and objectification data refers to data obtained through the objectification process. In the urban digital twin platform system 10 in accordance with an embodiment of the present disclosure, the multimodal sensor data input and objectification module 200 performs the data objectification.

Step S710 is a step of receiving the multimodal sensor data. Data used when performing objectification may be CCTV image data input from the CCTV recorder interface module 100. When the objectification is performed, one frame is used for image data. That is, in this step, one frame (2D image) of the CCTV image data may be received.

Step S720 is a step of detecting the moving object from the sensor data. For example, the multimodal sensor data input and objectification module 200 detects the moving object such as a vehicle or a pedestrian in one frame (2D image) of the CCTV image data. That is, the multimodal sensor data input and objectification module 200 detects the object for each frame of the image data. The multimodal sensor data input and objectification module 200 may detect the moving object such as a vehicle or a pedestrian on the basis of the position, horizontal length, and vertical length of the object in the 2D image by using a deep learning-based multi-object tracking technology. In this step, the existence, position, and size of the moving object may be ascertained, but it is not specified what the moving object is.

Step S730 is a step of classifying the moving object. For example, the multimodal sensor data input and objectification module 200 may determine whether the moving object detected in step S720 corresponds to a pedestrian, a bicycle, a car, a truck, or a bus.

Step S740 is a step of acquiring position data by detecting the position of the moving object on the sensor data. For example, the multimodal sensor data input and objectification module 200 may obtain coordinates (position vectors) in which the position of the moving object includes (longitude, latitude, and altitude). In the case of detecting the position of the moving object by using the CCTV image data, it is based on the premise that a region captured by a CCTV camera has been surveyed, and the CCTV camera has been calibrated in advance. Under such a premise, the multimodal sensor data input and objectification module 200 may obtain the position vectors of the moving object, that is, position data, by converting (mapping) pixel coordinates where the object is located in the CCTV image data (2D image) into (longitude, position, and altitude).

Step S750 is a step of acquiring direction data (direction vectors) and speed data by detecting the movement direction and speed of the object on the sensor data. The movement direction and speed of the object may be calculated by using the position data. In the case of using a position vector including (longitude, position, and altitude), the dimensions of the movement direction and speed of the object become three-dimensional. When estimating the three-dimensional movement direction and speed of the moving object by using the CCTV image data, the multimodal sensor data input and objectification module 200 refers to objectification data of a previous frame of the same object. When there is no previous frame, the multimodal sensor data input and objectification module 200 estimates no direction and speed data.

Figure 10:
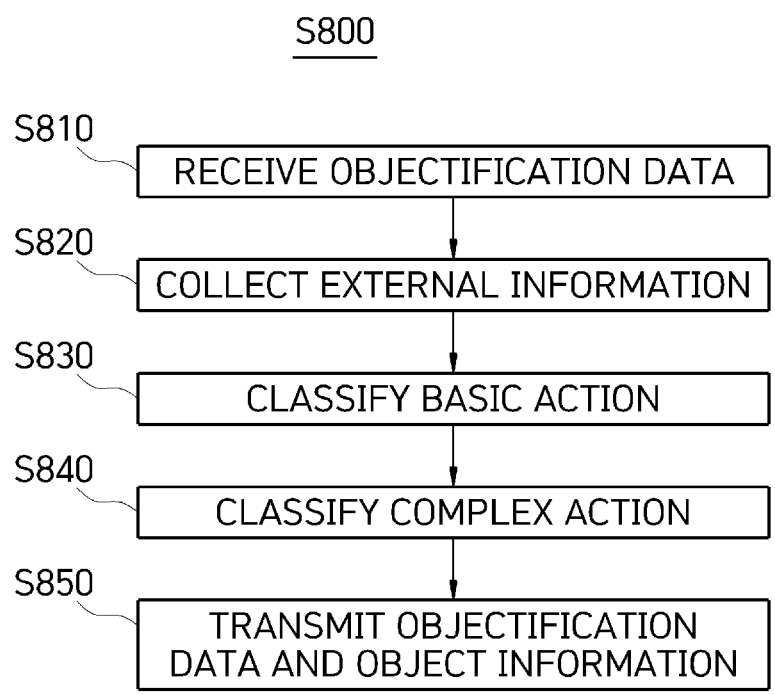
FIG. 10 is a flowchart for explaining a situation analysis method in accordance with an embodiment of the present disclosure.

FIG. 10 is a flowchart illustrating a situation analysis method in accordance with an embodiment of the present disclosure. The situation analysis method is a method used in step S800 of FIG. 8 and includes steps S810, S820, S830, S840, and S850.

The 'situation analysis (object information analysis)' refers to an operation of generating information (basic actions and complex actions) in units of objects that can be used as abasis for determination or decision-making by combining the objectification data and information collected from the outside. In the urban digital twin platform system 10 in accordance with an embodiment of the present disclosure, the multimodal sensor data analysis module 300 performs the situation analysis (object information analysis). That is, the multimodal sensor data analysis module 300 receives the objectification data and analyzes a situation (for example, a traffic situation). As described above, the present disclosure provides examples of basic actions and complex actions (traffic situations) of an objectified vehicle. However, the type of object and the type of situation are not limited thereto. For example, the situation analysis method in accordance with an embodiment of the present disclosure may be applied to other moving objects, such as pedestrians or bicycles. Furthermore, the situation analysis method in accordance with an embodiment of the present disclosure may also be applied to situations such as environments, energy, disasters, and safety in addition to the traffic situations.

Step S810 is a step of receiving the objectification data. The multimodal sensor data analysis module 300 receives the objectification data from the multimodal sensor data input and objectification module 200 for the purpose of an object situation analysis (for example, a traffic situation analysis). The multimodal sensor data input and objectification module 200 may transmit data collected by the other sensors 3 in addition to the objectification data to the multimodal sensor data analysis module 300. When receiving objectification data of a moving object generated on the basis of image data, the multimodal sensor data analysis module 300 defines an object detected in successive frames of the same sensor as the same object. The same local ID is given to the same object. Thereafter, the multimodal sensor data analysis module 300 classifies complex actions of the same object through situation analysis.

Step S820 is a step of collecting information related to the object from the outside. For example, the multimodal sensor data analysis module 300 may collect traffic information (for example, traffic signal information, traffic accident information, public transportation operation information, and road network data) corresponding to the same position as an objectified vehicle from the traffic information system 2. Furthermore, the multimodal sensor data analysis module 300 may collect situation data corresponding to the same position as the objectified vehicle from the other sensors 3 through the multimodal sensor data input and objectification module 200 and use the situation data for analysis.

Step S830 is a step of classifying the basic actions of the object. When the objectification data is data generated on the basis of image data, the multimodal sensor data analysis module 300 classifies basic actions of the objectified vehicle for each frame. In one frame, an object can be classified into two or more basic actions. For example, two or more basic actions of a vehicle (indicating an objectified vehicle) may be combined in one frame. An example of a combination of the basic actions of a vehicle may include a case in which the vehicle decelerates or accelerates in a left-turning state. For basic action classification of the objectified vehicle, the multimodal sensor data analysis module 300 may use the objectification data as well as at least one of multimodal sensor data, traffic signal information, traffic accident information, public transportation operation information, and road network data. Table 2 above shows examples of the basic actions of a vehicle.

Step S840 is a step of classifying the complex actions of the object. The multimodal sensor data analysis module 300 classifies complex actions with respect to the same object. That is, the multimodal sensor data analysis module 300 classifies the complex actions with respect to the same local ID through situation analysis. When the objectification data has been generated on the basis of image data, the basic actions of the objectified vehicle change in successive frames, and the multimodal sensor data analysis module 300 may classify complex actions of the objectified vehicle according to the frame change. That is, the multimodal sensor data analysis module 300 combines the basic actions of the object for each frame and external information (for example, traffic information and situation information), and classifies the complex actions of the object through situation analysis. For example, the multimodal sensor data analysis module 300 may estimate the traffic situation of 'overtaking' by combining 'lane change' and 'acceleration', which are basic actions of a vehicle. The multimodal sensor data analysis module 300 may analyze various traffic situations by using at least one of a plurality of basic actions of an object classified in successive frames, the position of the object, various multimodal sensor data, traffic signal information, traffic accident information, public transportation operation information, and road network data, or combining a plurality of pieces of data or information. Table 3 above presents an example of the vehicle situation analysis. Specifically, Table 3 above summarizes the results of estimating the complex actions of a vehicle by combining the basic actions of the vehicle and the traffic information.

Step S850 is a step of transmitting the objectification data and the analysis results (object information). The analysis results (object information) refer to the basic actions and the complex actions (situations) for the same object obtained through steps S830 and S840. Table 4 above shows an example of the objectification data for which the complex action classification of the same object has been completed in successive frames when the objectification data has been generated on the basis of the image data. The multimodal sensor data analysis module 300 transmits the objectification data (combination of the objectification data and the object information), for which the complex action classification of the same object has been completed as shown in Table 4 above, to the urban space data server 400.

Figure 11:
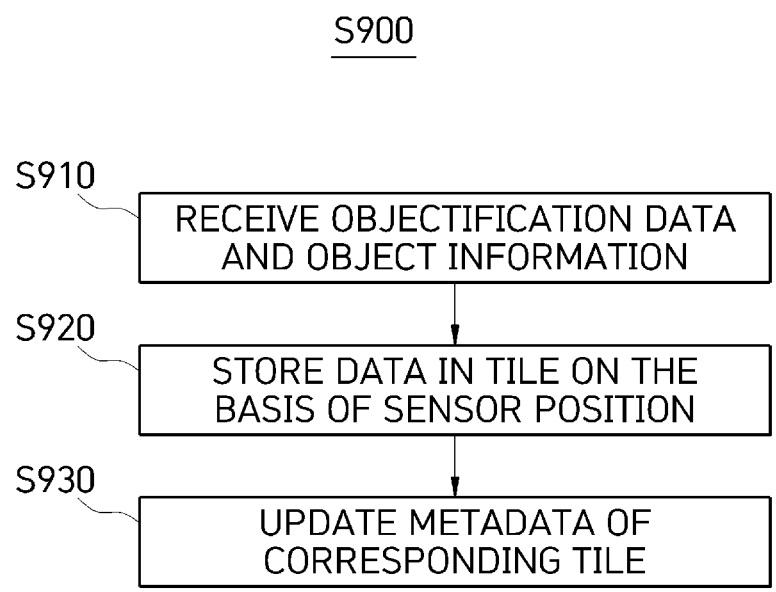
FIG. 11 is a flowchart for explaining a tile-based data storage method in accordance with an embodiment of the present disclosure.

FIG. 11 is a flowchart illustrating a tile-based data storage method in accordance with an embodiment of the present disclosure. The tile-based data storage method is a method used in step S900 of FIG. 8 and includes steps S910, S920, and S930. In the urban digital twin platform system 10 in accordance with an embodiment of the present disclosure, the urban space data server 400 performs the tile-based data storage method.

Step S910 is a step of receiving the objectification data and the object information. The urban space data server 400 receives the objectification data and the analysis results (object information) from the multimodal sensor data analysis module 300.

Step S920 is a step of storing data for each tile on the basis of the sensor position. The urban space data server 400 stores the objectification data and the analysis results (object information) in a position-based tile. In such a case, not the position of the object, but the installation position of a sensor having collected object data (having detected the object) is used as a reference.

Step S930 is a step of updating metadata of the corresponding tile. The urban space data server 400 updates the metadata when the metadata of the corresponding tile is changed, such as additional installation or removal of a sensor.

For reference, the components in accordance with an embodiment of the present disclosure may be implemented in the form of software or hardware such as a field programmable gate array (FPGA) or an application specific integrated circuit (ASIC), and may perform predetermined roles.

However, the term 'components' are not limited to software or hardware, and each component may be configured to reside in an addressable storage medium or to reproduce one or more processors.

Accordingly, as an example, the components include components such as software components, object-oriented software components, class components, and task components, processes, functions, attributes, procedures, subroutines, segments of a program code, drivers, firmware, microcode, circuitry, data, databases, data structures, tables, arrays, and variables.

Components and functions provided within the components may be combined into a smaller number of components or further divided into additional components.

In such a case, it will be understood that each block of the flowchart and combinations of the flowchart may be performed by computer program instructions. These computer program instructions may be loaded on a processor of a general purpose computer, special purpose computer, or other programmable data processing equipment, so that the instructions, which are executed via the processor of the computer or other programmable data processing equipment, generate means for performing the functions described in the block(s) of the flowchart. These computer program instructions may use a computer that may direct the computer or other programmable data processing equipment, or be stored in a computer readable memory in order to implement the functions in a particular manner, so that instructions using the computer or stored in a computer readable memory may also produce a manufacturing article including instruction means for performing the functions described in the block(s) of the flowchart. The computer program instructions may also be loaded on the computer or other programmable data processing equipment, so that a series of operation steps are performed on the computer or other programmable data processing equipment to produce a computer-implemented process, thereby allowing the instructions executed on the computer or other programmable data processing equipment to provide steps for performing the functions described in the block(s) of the flowchart.

Furthermore, each block may represent a module, a segment, or a part of a code that includes one or more executable instructions for performing specified logical function(s). It should be noted that in some alternative implementations, the functions mentioned in the blocks may occur out of order. For example, two blocks shown one after another may be performed substantially simultaneously, or the blocks may sometimes be performed in the reverse order according to a corresponding function.

In this regard, the term ' . . . module' used in the present embodiment means software or hardware components such as FPGA or ASIC, and ' . . . module' performs certain roles. However, the ' . . . module' is not limited to software or hardware. The ' . . . module' may be configured to reside in an addressable storage medium or may be configured to reproduce one or more processors. Accordingly, as an example, the ' . . . module' includes components such as software components, object-oriented software components, class components, and task components, processes, functions, attributes, procedures, subroutines, segments of a program code, drivers, firmware, microcode, circuitry, data, databases, data structures, tables, arrays, and variables. Components and functions provided within the ' . . . module' may be combined into a smaller number of components or further divided into additional components and ' . . . modules'. In addition, the components and the ' . . . modules' may be implemented to reproduce one or more CPUs in a device or a secure multimedia card.

The data objectification method, the situation analysis method, and the tile-based data storage method described above have been described with reference to the flowchart illustrated in the drawings. For convenience of description, the methods have been illustrated and described as a series of blocks. However, the present disclosure is not limited to the order of the blocks, and some blocks may occur in a different order or concurrent from or with other blocks than those illustrated and described herein, and various other branches, flow paths, and orders of blocks may be implemented to achieve the same or similar result. Furthermore, not all illustrated blocks may be required for implementation of the methods described in the present specification.

Although the configuration of the present disclosure has been described in detail with reference to the accompanying drawings, this is merely an example, and those skilled in the art to which the present disclosure pertains can make various modifications and changes within the scope of the technical spirit of the present disclosure. Therefore, the scope of protection of the present disclosure should not be limited to the above-described embodiments and should be defined by the description of the appended claims.

What is claimed is:

1. An urban digital twin platform system comprising:
    a multimodal sensor data input and objectification module configured to detect a moving object from data collected by a sensor and to generate objectification data that is data on the moving object;
    a multimodal sensor data analysis module configured to classify basic actions of the moving object on a basis of the objectification data, to classify complex actions of the moving object through pattern analysis on the basic actions, and to generate moving object information; and
    an urban space data server configured to store the objectification data and the moving object information,
    wherein, when the data collected by the sensor is image data, the multimodal sensor data input and objectification module acquires a position vector of the moving object by converting pixel coordinates where the moving object is located in the image data into (longitude, latitude, and altitude).

2. The urban digital twin platform system of claim 1, further comprising:
    a CCTV recorder interface module configured to provide the multimodal sensor data input and objectification module with an interface for accessing image data stored in a CCTV recorder.

3. The urban digital twin platform system of claim 1, further comprising:
    an urban space data visualization module configured to extract the objectification data and the moving object information, which are stored in the urban space data server, according to time and spatial conditions, and to visualize the extracted objectification data and the moving object information.

4. The urban digital twin platform system of claim 3, wherein the urban space data visualization module is able to reproduce dynamic data including the moving object by changing viewpoints.

5. The urban digital twin platform system of claim 1, wherein, when the data collected by the sensor is image data, the multimodal sensor data input and objectification module detects the moving object for each frame of the image data.

6. The urban digital twin platform system of claim 1, wherein, when the data collected by the sensor is image data, the multimodal sensor data input and objectification module detects the moving object on a basis of a position and a size of the moving object displayed in the image data by using a deep learning-based multi-object tracking technology.

7. The urban digital twin platform system of claim 1, wherein the multimodal sensor data analysis module classifies the basic actions of the moving object by using the objectification data of the moving object and information collected from outside.

8. The urban digital twin platform system of claim 1, wherein the multimodal sensor data analysis module classifies the complex actions of the moving object by determining whether a pattern of a plurality of successive basic actions of the moving object matches a specific pattern, and the complex actions include combined basic actions.

9. The urban digital twin platform system of claim 1, wherein the urban space data server stores the objectification data and the moving object information for each of a plurality of tiles on a basis of an installation position of a sensor having detected the moving object.

10. The urban digital twin platform system of claim 1, wherein the urban space data server stores only the objectification data and the moving object information without storing image data collected by a camera sensor.

11. A moving object information analysis and management method comprising:
   a data objectification step of detecting a moving object from sensor data and generating objectification data that is data on the moving object;
   a situation analysis step of classifying basic actions of the moving object at a specific point in time on a basis of the objectification data, classifying complex actions of the moving object through situation analysis based on the basic actions of the moving object, and generating moving object information; and
   a data storage step of storing the objectification data and the moving object information,
   wherein, when the sensor data is image data, a position vector of the moving object is acquired by converting pixel coordinates where the moving object is located in the image data into (longitude, latitude, and altitude).

12. The moving object information analysis and management method of claim 11, wherein the data objectification step comprises:
   a sensor data reception step of receiving data collected by a sensor;
   a moving object detection step of detecting a moving object from the data collected by the sensor;
   a step of classifying the moving object;
   a step of acquiring position data of the moving object on a basis of the data collected by the sensor; and
   a step of acquiring direction data and speed data of the moving object by using the position data.

13. The moving object information analysis and management method of claim 11, wherein the situation analysis step comprises:
   a step of receiving the objectification data of the moving object;
   an external information collection step of collecting information related to the moving object from outside;
   a basic action classification step of classifying the basic actions of the moving object at a specific point in time by using the objectification data of the moving object and the information collected from the outside; and
   a complex action classification step of classifying the complex actions of the moving object through situation analysis based on the basic actions of the moving object.

14. The moving object information analysis and management method of claim 11, wherein the data storage step comprises:
   an objectification data and object information reception step of receiving the objectification data and the moving object information;
   a step of storing the objectification data and the moving object information for each of a plurality of tiles on a basis of an installation position of a sensor having detected the moving object; and
   a step of updating metadata of a specific tile when a sensor is additionally installed or removed in the specific tile.

\* \* \* \* \*